United States Patent Office 3,651,009
Patented Mar. 21, 1972

3,651,009
MODIFIED ELASTOMERIC ETHYLENE/PROPYL-
ENE COPOLYMERS AND PROCESS FOR PRO-
DUCING SAME
Nazzareno Cameli, Paolo Longi, and Alberto Valvassori,
Milan, Italy, assignors to The B. F. Goodrich Company,
Akron, Ohio
No Drawing. Filed Apr. 13, 1970, Ser. No. 28,076
Claims priority, application Italy, Apr. 14, 1969,
15,533/69
Int. Cl. C08f 17/00
U.S. Cl. 260—41 R
12 Claims

ABSTRACT OF THE DISCLOSURE

Quaternary, sulfur-vulcanizable copolymers of ethylene, propylene, dicyclopentadiene and alkyltricyclo(6,2,1,0$^{2,7}$) 4,9-undecadiene are disclosed. Although at least half of the relatively expensive alkyltricyclo(6,2,1,0$^{2,7}$)4,9-undecadiene is replaced by relatively inexpensive dicyclopentadiene in the new copolymers, the copolymers, while being less expensive than the known ternary copolymers of ethylene, propylene, alkyltricyclo-undecadiene, have the same desirable properties of those known terpolymers, and have a faster vulcanization rate than ethylene/propylene/dicyclopentadiene copolymers prepared under like conditions.

A process for preparing the new quaternary copolymers, using catalysts prepared from hydrocarbon-soluble vanadium compounds and hydrides or organometallic compounds of beryllium, aluminum, or lithium-aluminum complexes is also disclosed.

THE PRIOR ART

Elastomeric copolymers of ethylene and propylene are known, having been disclosed by Natta et al.

Those copolymers, which are saturated, are not normally vulcanizable by the conventional methods using recipes based on sulfur.

It has been proposed to modify the elastomeric ethylene/propylene copolymers by including a relatively small amount of an unsaturated termonomer in the copolymerization zone whereby double bonds are introduced into the copolymer macromolecules and render the copolymer sulfur-vulcanizable by the conventional methods.

For example, Italian Pat. No. 741,045 discloses and claims terpolymers of ethylene, propylene and alkyltricyclo-undecadiene. Said terpolymers are prepared by copolymerizing a mixture of the three monomers in contact with a catalyst which is soluble in, or highly dispersible in, a liquid polymerization medium in which the copolymerization is carried out.

The terpolymers thus obtained have a low unsaturation content, generally 1.5% to 2% by weight, are easily sulfur-vulcanizable by the conventional methods, at particularly fast vulcanization rates, to elastomers having valuable properties.

Those terpolymers have the economic disadvantage that the monomeric alkyltricyclo-undecadiene is relatively expensive, which makes the copolymers and vulcanizates thereof rather costly.

THE PRESENT INVENTION

An object of this invention was to provide modified, sulfur-vulcanizable elastomeric ethylene/propylene copolymers having the desirable characteristics of the ethylene/propylene/alkyltricyclo - undecadiene copolymers, including a high vulcanization rate, but which are less costly than said terpolymers.

This and other objects are achieved by this invention in accordance with which we have found that if, in preparing the copolymers, and instead of alkyltricycloundecadiene alone, there is used a mixture of the alkyltricycloundecadiene and dicyclopentadiene in a molar ratio of from 5:1 to 1:5, we obtain quaternary copolymers which are less costly than the terpolymers, yet have all of the desirable characteristics of the terpolymers, including a high vulcanization rate.

Since the polymerization rates of dicyclopentadiene and alkyltricycloundecadiene in the presence of ethylene and propylene are fully comparable, the substitution of at least one half of the relatively expensive alkyltricycloundecadiene normally used, by the relatively inexpensive dicyclopentadiene, introduces no complications into the copolymerization process.

On the contrary, the substitution has the great economic advantage of resulting in desirable new copolymers which are less costly and therefore more competitive.

The new quaternary copolymers are obtained by copolymerizing a mixture of the four monomers in liquid phase and in contact with catalysts which are preferably halogen-containing and soluble in, or highly dispersible in, the liquid polymerization medium. The catalysts are prepared by mixing (a) A hydride or organometallic compound of beryllium, aluminum and lithium-aluminum such as for instance: beryllium dialkyls, aluminum trialkyls, lithium-aluminum tetraalkyls, beryllium alkyl chlorides, aluminum akyl chlorides (monodi- or sesqui-chlorides) aluminum phenyl bromides, lithium-aluminum monofluorotrialkyls, beryllium phenyl iodide, etc., with (b) A vanadium compound soluble in hydrocarbons, chosen, for instance, from amongst: vanadium halides and vanadium and vanadyl acetylacetonates, vanadium and vanadyl halogeno-alcoholates and halogeno-acetylacetonates, complexes obtained from vanadium halides and vanadium oxyhalides with Lewis bases. etc.

The preferred catalysts are those in which at least one of the components (a) or (b) contains at least one halogen atom. The polymerization is carried out at temperatures comprised between —80° and +125° C., but preferably between —30° and +30° C., since within this range the above mentioned catalysts have optimum activity and stability.

The polymerization is carried out in liquid phase, either in the presence or in the absence of solvents for the formed copolymer, such as for instance: aliphatic, aromatic or cycloaliphatic hydrocarbons. There may also be used chlorinated hydrocarbons which do not react with the catalysts used, for instance: chlorobenzene, tetrachloroethylene, methyl chloride, etc.

When operating in the absence of solvents, the liquid polymerization medium consists predominantly of a liquified ethylene/propylene mixture in which the formed copolymer is insoluble. In this case the polymerization takes place in suspension.

In order to obtain polymers of a molecular weight which is not too high for ready processing on conventional processing equipment it may be desirable to include a known molecular weight regulator, such as, for instance, hydrogen or a zinc alkyl, in the copolymerization zone.

In order to obtain copolymers having a highly homogeneous composition, it is necessary, throughout the course of the polymerization, to maintain constant or as constant as possible, the ratios between the concentrations of the four monomers in the liquid polymerization medium.

By varying these ratios, the composition of the copolymers may be varied within a wide range. The preferred molar ratios between ethylene and propylene, in liquid phase, for obtaining amorphous copolymers containing less than 85% in moles of ethylene, are comprised between 1.200 and 1:4.

When said ratios are greater than 1:4, there are generally obtained copolymers which show a crystallinity of the polyethylenic type. Preferably, the copolymers of the invention have a polymerized propylene content of from 50% to 15% in moles: the sum of the two polymerized dienes is comprised between 0.1 and 20% in moles. The balance is polymerized ethylene.

The preferred molar ratio between alkyltricycloundecadiene and dicyclopentadiene in the obtained copolymers is comprised between 5:1 and 1:5, but good vulcanizing characteristics may also be achieved with copolymers in which said molar ratio is in the range 1:10 to 10:1.

The copolymers of this invention have a linear structure, that is, they are free of long branchings, as is proved by the fact that their properties, in particular their viscous behaviour, are practically the same as those of the known linear ethylene/propylene copolymers.

The copolymers of this invention have molecular weights generally greater than 20,000; that is, they have an intrinsic viscosity, determined in tetrahydronaphthalene at 135° C. (or in toluene at 30° C.), greater than 0.5 dl./g.

At an unsaturation content of greater than 0.4% in moles, the obtained copolymers are easily vulcanizable by the usual vulcanization methods, such as for instance methods using vulcanization recipes comprising sulphur, accelerators and carbon black.

The following examples give a number of vulcanization rates. From the examples it also appears that the vulcanized copolymers possess excellent physical, mechanical and dynamic properties.

These properties adapt the copolymers of this invention to all those uses for which natural rubber and other synthetic rubbers are used and may conveniently replace the natural and known synthetic rubbers with advantage.

The following examples are given to illustrate the invention and are not intended to be limiting.

EXAMPLE 1

The reaction apparatus consisted of a glass cylinder having a diameter of 10 cm. and a holding capacity of 4000 cc., provided with a stirrer, a thermometer and inlet and outlet pipes for the gases. The gas inlet pipe reached the bottom of the reaction vessel and terminated in a porous diaphragm.

Into the reactor, kept at −20° C. by immersion in a thermostatic bath, were introduced 3000 cc. of n-heptane; 2 cc. of dicyclopentadiene, 2 cc. of 4-methyltricyclo-(6,2,1,0$^{2,7}$)4,9 undecadiene and 0.3 millimole of diethyl zinc.

Through the gas inlet pipe was introduced a mixture of propylene and ethylene in a molar ratio of 2:1. It was circulated at a rate of 1200 Nl./hr.

After 30 minutes of saturation, 7.5 millimoles of aluminum diethyl chloride and 0.25 millimole of vanadyl diacetylacetonate dissolved in 20 cc. of toluene were put into the reactor. The propylene-ethylene mixture was continuously fed and discharged during the run, at a rate of 1200 Nl./hr.

Thirty minutes after introduction of the catalyst, the reaction was interrupted by the addition of 10 cc. of methanol.

The product was purified in a separator funnel by means of repeated washings with diluted hydrochloric acid, then with water and finally with an acetone/methanol mixture.

After drying under vacuum, there were obtained 58 g. of a solid product, amorphous on X-ray analysis, having the aspect of an unvulcanized elastomer, and soluble in boiling n-heptane. By infrared spectrographic analysis, the product was shown to contain 32% by weight of propylene, 1.8% by weight of dicyclopentadiene and 2.3% by weight of methyltricycloundecadiene.

The Mooney viscosity (ML–4 at 100° C.) amounted to 103.

100 parts by weight of copolymer were admixed to 80 parts by weight of ISAF carbon black, 5.5 parts by weight of Flexon 766 oil, 1 part of stearic acid, 5 parts of zinc oxide, 0.75 part of mercaptobenzothiazol, 1.5 parts of tetramethylthiuram-monosulphide and 1.5 parts of sulphur. The mix was then vulcanized in a press at 150° C. and for different times.

The properties of the vulcanized products are recorded in the following table:

| Time, in minutes | 15 | 30 | 60 | 90 | 120 | 180 | 240 |
| --- | --- | --- | --- | --- | --- | --- | --- |
| Tensile strength (kg./cm.$^2$) | 242 | 232 | 215 | 176 | 208 | 203 | 206 |
| Elongation at break, in percent | 690 | 500 | 420 | 370 | 403 | 390 | 390 |
| Elastic modulus at 200% (kg./cm.$^2$) | 28 | 54 | 63 | 70 | 68 | 65 | 64 |
| Elastic modulus at 300% (kg./cm.$^2$) | 58 | 107 | 125 | 133 | 138 | 138 | 139 |
| Permanent set, in percent | 36 | 22 | 11 | 10 | 10 | 8 | 8 |

As appears from the above reported data, the maximum degree of reticulation (deducible from the values of the elastic modulus) is attained after 90 minutes; after 60 minutes the degree of reticulation was about 95% of the maximum value.

EXAMPLE 2

Example 1 was repeated except that a mixture of 3 cc. of dicyclopentadiene and 1 cc. of methyltricycloundecadiene was used.

Thereby were obtained 50 g. of amorphous copolymer containing 33% by weight of propylene, 3.4% by weight of dicyclopentadiene and 1.5% by weight of methyltricycloundecadiene. The Mooney viscosity value amounted to 97.

The copolymer was then vulcanized with the same mix and under the same conditions as described in Example 1. The properties of the vulcanized products are recorded in the following table:

| Time, in minutes | 15 | 30 | 60 | 90 | 120 | 180 | 240 |
| --- | --- | --- | --- | --- | --- | --- | --- |
| Tensile strength (kg./cm.$^2$) | 232 | 239 | 238 | 226 | 239 | 222 | 221 |
| Elongation at break, in percent | 780 | 610 | 500 | 460 | 480 | 450 | 440 |
| Elastic modulus at 200% (kg./cm.$^2$) | 27 | 38 | 53 | 58 | 54 | 56 | 61 |
| Elastic modulus at 300% (kg./cm.$^2$) | 50 | 75 | 107 | 117 | 113 | 116 | 117 |
| Permanent set, in percent | 40 | 26 | 18 | 16 | 16 | 12 | 14 |

As appears from the above data, the vulcanization rate was similar to that of the copolymer of Example 1.

EXAMPLE 3

This copolymerization run was carried out under the same conditions as those of Example 1, using 4 cc. of 4 - methyltricyclo(6,2,1,0$^{2,7}$)4,9 - undecadiene. Thereby were obtained 44 g. of a copolymer having a Mooney viscosity of 129. It contained 35% by weight of propylene and 3.5% by weight of methyltricycloundecadiene.

Said copolymer was then vulcanized with the same mix and under the same conditions as in Example 1.

The properties of the vulcanized products are reported in the following table:

| Time, in minutes | 15 | 30 | 60 | 90 | 120 | 180 | 240 |
| --- | --- | --- | --- | --- | --- | --- | --- |
| Tensile strength (kg./cm.$^2$) | 227 | 192 | 186 | 183 | 190 | 186 | 184 |
| Elongation at break, in percent | 560 | 440 | 370 | 340 | 350 | 340 | 340 |
| Elastic modulus at 200% (kg./cm.$^2$) | 57 | 73 | 83 | 86 | 79 | 80 | 87 |
| Elastic modulus at 300% (kg./cm.$^2$) | 108 | 148 | 157 | 162 | 158 | 159 | 166 |
| Permanent set, in percent | 25 | 15 | 10 | 9 | 8 | 8 | 8 |

As appears from the above recorded data, the vulcanization rate is similar to that of the copolymers described in Examples 1 and 2.

EXAMPLE 4

This copolymerization run was carried out under the same conditions as in Example 1, using 4 cc. of dicyclopentadiene.

Thereby were obtained 53.8 g. of an amorphous ethylene/propylene/dicyclopentadiene terpolymer having a Mooney viscosity of 82. It contained 32% by weight of propylene and 3.5% by weight of dicyclopentadiene.

The terpolymer was vulcanized with the same mix and under the same conditions as in Example 1, to obtain vulcanized products having the properties shown in the following table:

| Time, in minutes | 15 | 30 | 60 | 90 | 120 | 180 | 240 |
|---|---|---|---|---|---|---|---|
| Tensile strength (kg./cm.$^2$) | 190 | 224 | 246 | 216 | 235 | 238 | 236 |
| Elongation at break, in percent | 820 | 680 | 590 | 490 | 490 | 480 | 460 |
| Elastic modulus at 200% (kg./cm.$^2$) | 18 | 26 | 38 | 44 | 53 | 54 | 56 |
| Elastic modulus at 300% (kg./cm.$^2$) | 30 | 52 | 77 | 94 | 106 | 112 | 118 |
| Permanent set, in percent | 40 | 30 | 24 | 24 | 24 | 14 | 12 |

As appears from the data shown in the above table, the vulcanization rate of the terpolymer is much lower than that of the quaternary copolymers described in Examples 1 and 2.

The values of the elastic modulus at 300% increased with time; thus, after 60 minutes the value of the modulus amounted to only 65% of the value measured after 240 minutes.

EXAMPLE 5

Operating under the conditions set forth in Example 1, an ethylene/propylene/dicyclopentadiene/4,5 dimethyltricyclo(6,2,1,0$^{2,7}$)4,9 undecadiene copolymerization run was carried out using 2 cc. of dimethyltricycloundecadiene and a propylene/ethylene molar ratio of 3:1.

Thereby were obtained 47 g. of a product having a Mooney viscosity of 125. It contained 40% by weight of propylene, and 2.2% by weight of dicyclopentadiene.

Said copolymer was then vulcanized with the same mix and under the same conditions as in Example 1, to obtain vulcanized products having the properties shown in the following table:

| Time, in minutes | 15 | 30 | 60 | 90 | 120 | 180 | 240 |
|---|---|---|---|---|---|---|---|
| Tensile strength (kg./cm.$^2$) | 235 | 212 | 190 | 182 | 197 | 198 | 196 |
| Elongation at break, in percent | 650 | 480 | 410 | 370 | 370 | 380 | 370 |
| Elastic modulus at 200% (kg./cm.$^2$) | 32 | 53 | 69 | 73 | 70 | 71 | 67 |
| Elastic modulus at 300% (kg./cm.$^2$) | 67 | 99 | 127 | 137 | 140 | 140 | 139 |
| Permanent set, in percent | 36 | 16 | 10 | 8 | 10 | 10 | 10 |

As appears from the data reported in the above table, the vulcanization rate of the quaternary copolymer was similar to that of the copolymers described in Examples 1 and 2.

EXAMPLE 6

Example 5 was repeated, except that a mixture of 3 cc. of dicyclopentadiene and 1 cc. of 4,5-dimethyltricycloundecadiene was used. Thereby were obtained 44 g. of a quaternary copolymer having the following characteristics:

Mooney viscosity—112
Content in propylene—37% b.w.
Content in dicyclopentadiene—3.1% b.w.

The copolymer was vulcanized with the same mix and under the same conditions as in Example 1.

The vulcanized products had the properties recorded in the following table:

| Time, in minutes | 15 | 30 | 60 | 90 | 120 | 180 | 240 |
|---|---|---|---|---|---|---|---|
| Tensile strength (kg./cm.$^2$) | 237 | 231 | 203 | 204 | 211 | 205 | 202 |
| Elongation at break, in percent | 730 | 580 | 440 | 420 | 400 | 400 | 400 |
| Elastic modulus at 200% (kg./cm.$^2$) | 25 | 38 | 56 | 59 | 61 | 62 | 60 |
| Elastic modulus at 300% (kg./cm.$^2$) | 45 | 77 | 111 | 117 | 125 | 125 | 122 |
| Permanent set, in percent | 40 | 24 | 12 | 12 | 10 | 10 | 10 |

As appears from the data reported in the table, the vulcanization rate for the copolymer of this example is similar to that of the copolymers described in Examples 1 and 2.

EXAMPLE 7

The reaction apparatus was a 1-litre glass autoclave provided with a stirrer and a thermocouple. Into this autoclave, maintained at −20° C., were introduced in the given order: 2 cc. of 4-methyl-tricycloundecadiene, 2 cc. of dicyclopentadiene, 0.3 millimole of zinc diethyl, 7 millimoles of Al(C$_2$H$_5$)$_2$Cl and 500 cc. of propylene.

After the introduction of the ethylene up to an increase in the pressure of 1 atmosphere, there were introduced 0.03 millimole of vanadium triacetylacetonate dissolved in 1.5 cc. of anhydrous toluene.

During the polymerization, the pressure was maintained constant by repeated feedings of ethylene.

The polymerization was interrupted after 40 minutes from the introduction of the vanadium compound.

After the removal of the unreacted olefins, the polymer was dissolved in toluene, purified from the catalytic residues and then coagulated with an acetone-methanol mixture. After drying under vacuum, there were obtained 18 g. of product.

On examination by infrared spectrography, the product was shown to contain, by weight, 3.7% of propylene, 2.8% of methyltricycloundecadiene, and 2.6% of dicyclopentadiene. The Mooney viscosity amounted to 147.

The properties of the vulcanized products are recorded in the following table:

| Time, in minutes | 15 | 30 | 60 | 90 | 120 | 180 | 240 |
|---|---|---|---|---|---|---|---|
| Tensile strength (kg./cm.$^2$) | 235 | 219 | 209 | 189 | 207 | 206 | 207 |
| Elongation at break, in percent | 550 | 440 | 370 | 350 | 350 | 350 | 350 |
| Elastic modulus at 200% (kg./cm.$^2$) | 45 | 65 | 77 | 83 | 85 | 87 | 88 |
| Elastic modulus at 300% (kg./cm.$^2$) | 90 | 132 | 160 | 168 | 170 | 173 | 175 |
| Permanent set, in percent | 20 | 12 | 10 | 8 | 8 | 6 | 6 |

As is apparaent from the table, and the values of the modulus reported, the vulcanization rate of the copolymer of this example is greater than that of an ethylene/propylene/dicyclopentadiene copolymer.

It will be evident that changes in details may be made in practicing the invention without departing from its spirit. Therefore, we intend to include in the appended claims all modifications and variations which will be obvious to those skilled in the art from the description and working examples given herein.

We claim:

1. An unsaturated sulfur-vulcanizable copolymer having a molecular weight greater than 20,000 and comprising less than 85 mol percent ethylene, between 15 and 50 mol percent propylene and 0.1 to 20 mol percent dicyclopentadiene and alkyltricyclo(6,2,1,0$^{2,7}$)4,9-undecadiene in a molar ratio between 1:10 and 10:1.

2. Copolymers according to claim 1 characterized in having an intrinsic viscosity, determined in tetrahydronaphtalene at 135° C., greater than 0.5 dl./g.

3. Copolymers according to claim 2, characterized in containing at least 0.4% by moles of unsaturations.

4. Copolymers according to claim 3, characterized in containing polymerized alkyltricycloundecadiene units and polymerized dicyclopentadiene units in a molar ratio between 1:5 and 5:1.

5. Copolymers according to claim 1, characterized in having a vulcanization rate faster than that of copolymers of ethylene, propylene and dicyclopentadiene only, when vulcanized with conventional mixes based on sulfur.

6. Copolymers according to claim 5, characterized in that the alkyltricyclo(6,2,1,0$^{2,7}$)4,9-undecadiene is 4-methyltricyclo(6,2,1.0$^{2,7}$)4,9-undecadiene.

7. Copolymers according to claim 5, characterized in that the alkyltricyclo(6,2,1,0$^{2,7}$)4,9-undecadiene is 4,5-dimethyltricyclo(6,2,1,0$^{2,7}$)4,9-undecadiene.

8. Vulcanizable compositions characterized in comprising the copolymers according to claim 1.

9. Vulcanizable compositions, comprising sulphur or sulphur donor compounds as reticulating agents, vulcanization accelerators and reinforcing fillers, and further characterized in comprising the copolymers according to claim 1.

10. Vulcanizable compositions, according to claim 9, characterized in that the reinforcing filler is carbon black.

11. Sulfur vulcanized elastomers, characterized in being obtained by vulcanization of the copolymers of claim 1.

12. Sulfur vulcanized elastomers, characterized in being obtained by vulcanization of the vulanizable compositions of claim 9.

References Cited

UNITED STATES PATENTS

| | | | |
|---|---|---|---|
| 3,467,631 | 9/1969 | Valupssori | 260—79.5 |
| 3,554,988 | 1/1971 | Emde | 260—79.5 |

JAMES A. SEIDLECK, Primary Examiner

R. S. BENJAMIN, Assistant Examiner

U.S. Cl. X.R.

260—79.5 P, 80.78